219-121 CROSS REFERENCE SEARCH ROOM

Allen C. Bradham III,
Inventor,
Koenig, Senniger, Powers and Leavitt,
Attorneys.

Sept. 2, 1969 A. C. BRADHAM III 3,465,091

UNIVERSAL CIRCUIT BOARD AND METHOD OF MANUFACTURE

Filed Feb. 24, 1967 5 Sheets-Sheet 2

Sept. 2, 1969 A. C. BRADHAM III 3,465,091

UNIVERSAL CIRCUIT BOARD AND METHOD OF MANUFACTURE

Filed Feb. 24, 1967 5 Sheets-Sheet 5

United States Patent Office 3,465,091

Patented Sept. 2, 1969

3,465,091

UNIVERSAL CIRCUIT BOARD AND METHOD OF MANUFACTURE

Allen C. Bradham III, Menomonee Falls, Wis., assignor to Texas Instruments Incorporated, Dallas, Tex., a corporation of Delaware Continuation-in-part of application Ser. No. 599,114, Dec. 5, 1966. This application Feb. 24, 1967, Ser. No. 618,442

Int. Cl. H05k 1/02

U.S. Cl. 174—68.5 14 Claims

ABSTRACT OF THE DISCLOSURE

A master circuit board is prepared, comprising an insulating layer on opposite sides of which are attached conductive cross-barred metal grids, one set of the bars of which are staggered relative to one another in one direction across the plane of the layer. These grids present openings staggered on opposite sides of the layer. In the layer are zigzag conductive metal ribbons intertwining the staggered bars to expose lines of conductive areas on opposite faces of the layer in said staggered openings. These areas, with portions of the grids, form pockets for containment of heat-bondable metal conductive slugs. Substantially all of the exposed conductive surfaces of the grids and ribbons are covered with photoresist material. To convert a master board into a circuit board, there is provided scanning means in the form of a laser beam which is under control of programming tape or the like for scanning movement and intensity of evcitation. The beam while scanning is excited to one degree for intermittently exposing photoresist material on a grid which is subsequently developed and the grid etched to form desired circuitry. The beam is excited intermittently to another degree to heat portions of the ribbons and grids and of the slugs to form metallurgically bonded interconnections between the grids and the ribbons.

This application is a continuation-in-part of my copending application Ser. No. 599,114, filed Dec. 5, 1966, for Circuit Board and Method of Manufacture.

BACKGROUND OF THE INVENTION

Prior master circuit boards require a large amount of special art work for etching to provide patterns for establishing circuitry. In the case of two-sided, etched printed circuit boards, a problem of considerable magnitude arises when interconnections are to be made between the conductive layers on the two sides. This is generally done with feed-through connections in the form of plated holes between the circuit layers. This requires precise orientation of points on the layers at which drilling is to be done. The necessary art work, etching, drilling and plating are both complex and time-consuming. According to the invention, such art work is eliminated. Information for determining circuit patterns and interconnections is computer-generated and stored on magnetic tape for rapid transfer through scanning means to effect operations on the board. A single etch step is sufficient for a given side of a board to generate all segmentation of circuitry on that side, making simple the running of connections. This, and the scanning operation, result in a fast, accurate and reliable manufacturing method of making superior boards.

SUMMARY

The invention comprises making up master boards, each having an insulating layer, spaced ribbons or the like therein of conductive material, preferably of zigzag form, each extending in one direction across the board and exposing spaced and aligned areas thereof in staggered positions on two sides of the layer, with pockets of insulation behind said exposed areas. In the pockets are slugs of meltable conductive material. On opposite sides of the insulating layer are staggered conductive grids to locate lines of conductive material between the exposed areas of the ribbons, some of them crossing the slugs. Exposed surfaces of the grids and ribbons are covered by photoresist material. A master board as above made is scanned by a variably excited laser beam for exposing the photoresist material on the grids for later development into circuitry. The beam also melts the slugs or suitable portions thereof to form interconnections between the circuitry formed by the grids and ribbons. Excitation of the beam is programmed by suitable means such as magnetic tape on which information is computer-generated for obtaining the desired circuits.

BRIEF DESCRIPTION OF THE DRAWINGS

Corresponding reference characters indicate corresponding parts throughout the several views of the drawings. Board dimensions being small, sizes in the drawings are exaggerated for clarity.

DESCRIPTION OF THE PREFERRED EMBODIMENTS

Figure 1:
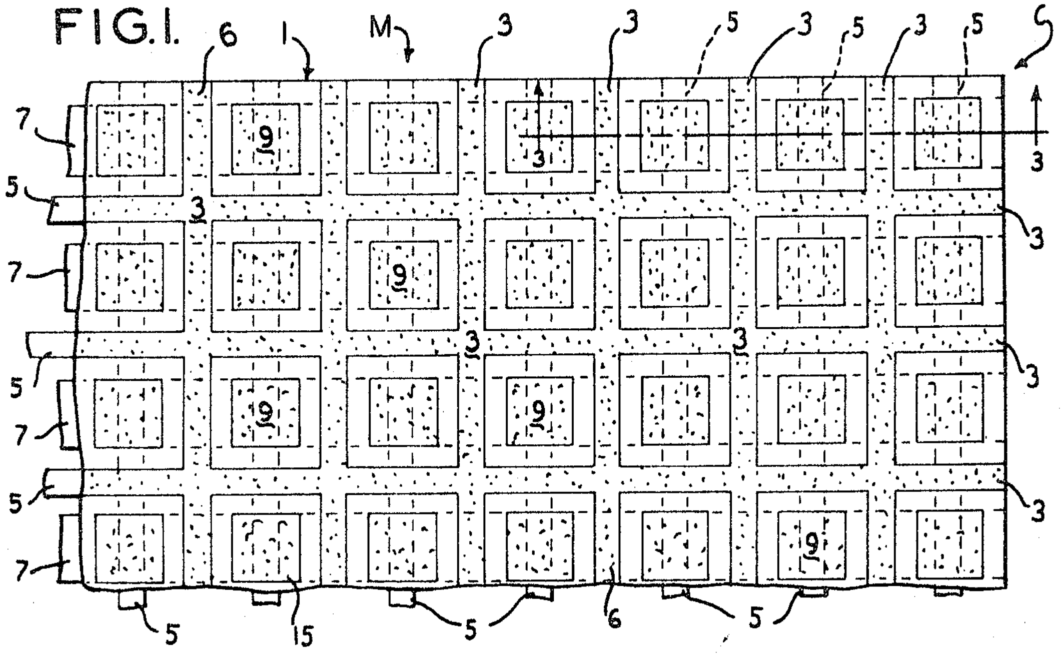
FIGURE 1 is a plan view of an upper righthand corner portion C of a first form of a master board made according to the invention.
Figure 2:
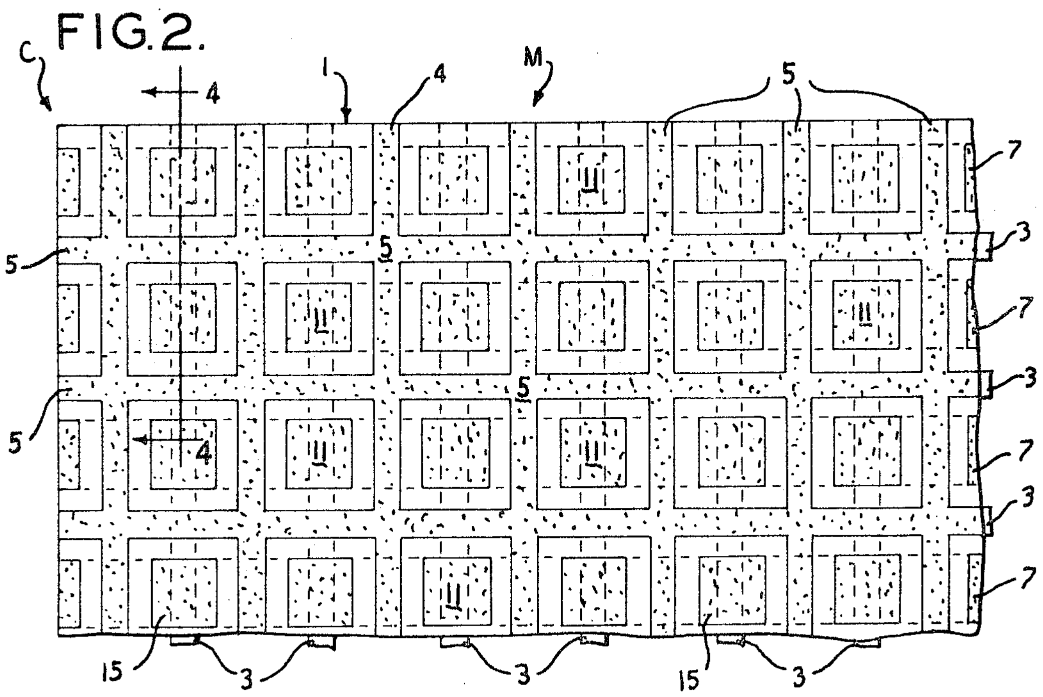
FIGURE 2 is a plan view of the other side of the same board, turned end-for-end from right to left from the FIGURE 1 position so that said corner portion C of FIGURE 1 appears at the upper left in FIGURE 2.
Figure 3:
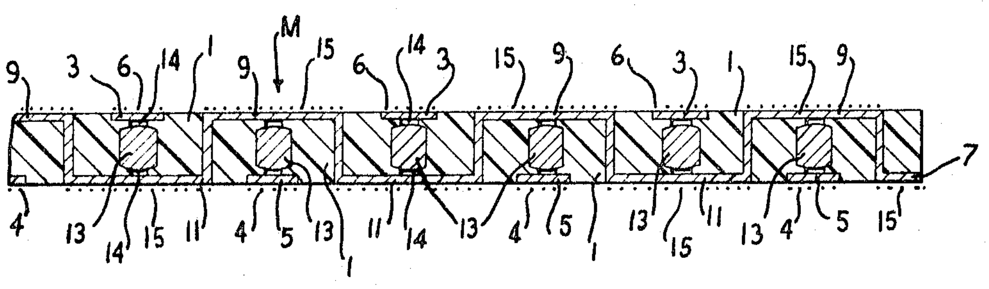
FIGURE 3 is an enlarged cross section taken on line 3—3 of FIGURE 1.

Referring to FIGURES 1–3, one form of the new board is shown in general at M. This comprises a layer 1 of a conventional plastic insulating material such as glass fibre or other fibre-filled epoxy resin or the like. This material provides a supporting insulating matrix for several thin conductive (for example, copper) foils or the like as follows: At 7 are shown preferably zigzag or serpentine ribbons of foil which extend horizontally across the insulating sheet from one edge to the other. These may be referred to as linear conductors. They produce exposed square portions 9 on one side of the board (FIGURES 1 and 3) and staggered exposed square portions 11 on the other side of the board (FIGURES 2 and 3). These exposed squares are in one form coated with a negative photoresist layer illustrated by dots 15 (FIGURE 3). On one side of the insulating material sheet 1 (FIGURE 1) is a thin squared grid 3 (FIGURE 1). This is composed of a foil of conductive metal such as copper suitably adhered to one face of the layer 1. It may be prepared by preliminary plating and photoetching (if desired), or by prepunching an adhesive attachment. In any event the grid 3 has its exposed face also coated with a layer of negative photoresist material, illustrated by dots 6 on FIGURES 1 and 3. On the other side of the layer 1 (FIGURE 2) is a similar conductive squared grid 5, coated with a layer of negative photoresist material illustrated by dots 4 on FIGURES 2 and 3.

Conventional photonegative etch resist material is capable of forming a resist which in areas exposed to incident radiation becomes hardened on its substrate against removal therefrom upon development and etching, unexposed areas being removable during appropriate development so as to leave the hardened exposed areas as an image against etching of the substrate. This image is called an etch resist image. Although not removable in an etch bath, the resist can ultimately be removed from the substrate after etching has been completed. Unexposed portions are removed during development, thus exposing the substrate to removal by etching. Hereinafter such material will be called an etch resist of the photonegative type.

The resist-covered grids 3 and 5 on opposite sides of the layer 1 have one set of their crossbars transversely staggered in one direction crosswise of the board. The other crossbars of the grids 3 and 5 are not staggered and extend in the general horizontal direction of the ribbons 7. Therefore, the grids have one set of bars or bands of material which extend crosswise of and are intertwined by the ribbons 7 and also have bars or bands of material which without being intertwined by any ribbons 7 extend parallel thereto. The parallel bands on opposite sides of the sheet 1 are in register. Thus opposite each exposed ribbon portion 9 or 11 there lies on the opposite side of the board a portion of the grid 5 or 3, respectively (see FIGURES 3 and 4). The openings in the grids frame the exposed portions of the ribbons.

At numerals 13 are shown slugs of conductive weldable or solderable metal or the like. For example, these may be composed of a conventional fluxed solder. One group of these slugs lies in the pockets of insulation between foil portions 5 and 9, and another group lies in the pockets of insulation between foil portions 3 and 11. Empty spaces 14 are provided in the insulation 1 at the ends of the slugs 13. By a laser-beam heating process to be described below, the ends of any slug 13 may be melted, along with adjacent conductive foil parts, thereby forming a conductive interconnection or junction 21 between grid 3 and a slug 13 and a junction 24 between grid 5 and slug 13 (see FIGURE 6). Such easily made connections take the place of connections which were formly made by drilling holes and plating through them.

A master board of the first form of the invention is one in the condition shown in FIGURES 1–4 which may be made up in quantities and stored, ready for conversion into operating circuit boards. Such conversion will now be described by reference to FIGURES 5–7.

Figures 4, 7:
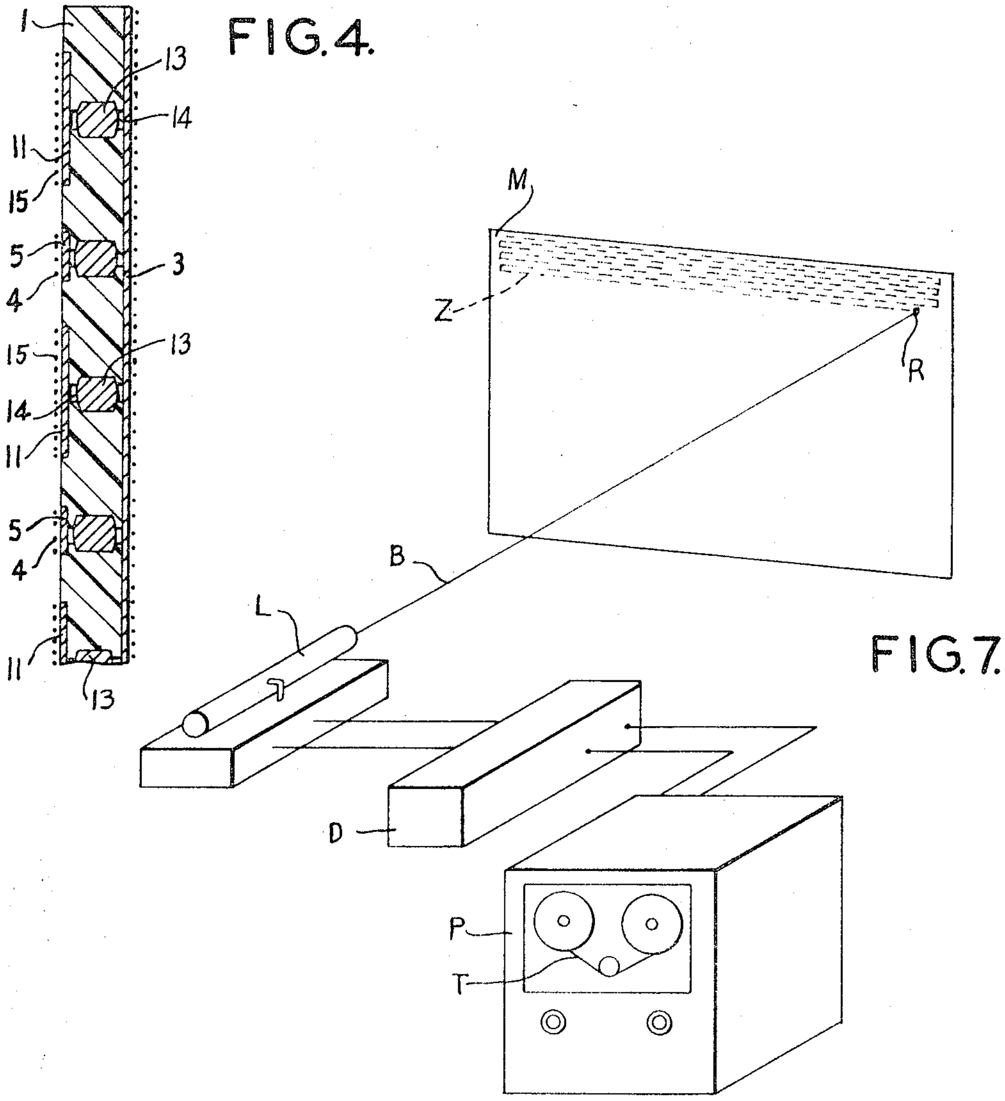
FIGURE 4 is an enlarged cross section taken on line 4—4 of FIGURE 2.
FIGURE 7 is a schematic view of scanning means employed for converting a master board such as shown in FIGURES 1–3 into an operating circuit board such as shown in FIGURES 5 and 6.

A master board M is mounted as shown schematically in FIGURE 7 to be impinged upon by a scanning beam B of a scanning laser gun L. At D is shown a deflection controller and beam modulator for the laser gun L. At P is shown a programmer for the deflection controller and modulator D. This is under control of magnetic programming tape T. The tape T provides information by means of which the beam B is deflected in known manner to sweep an appropriately focused beam trace R back and forth across a face of the board M, as indicated at Z.

In FIGURE 7, due to its small size, the grids 3, 5 and ribbons 7 are not shown. It will be understood that the spacing between traverses in such that the transverse paths of the focused trace R graze or slightly overlap one another so that the entire field or any desired part of a board M may be exposed to the trace R when all sweeps between it tops and bottom edges have been completed, whether or not the trace R is dimensioned to be smaller than the width of any ribbon or grid bar. A complete scan of sweeps from top to bottom takes only a few microseconds. After one side of a board has been scanned and processed as appears below, it is turned over and the other side scanned.

During each field-scanning operation, the intensity level of the beam B is varied in accordance with a program therefor carried by the tape T. The variation is according to three categories, which may be referred to as "nonexposure," "exposure" and "heating." Nonexposure means that the beam is excited to a very low energy (if any) so as to provide no effect on the board. Exposure means that it is excited sufficiently to expose a film of the photoresist material so that it may later be developed to form an etch-protective layer where exposed and developed, and washed away where unexposed to provide conductor segmentations. Where washed away, subsequent etching separates from one another various sections of the grids and ribbons. For example, on FIGURE 5 the open spaces 19 and 20 show separations thus made in grid 3 and portions of said ribbons 7, respectively. Similarly, the other side of the board may be scanned and exposed to effect like separations in the grid 5 and the exposed portions of the ribbon 7 on that side of the board.

Figure 5:
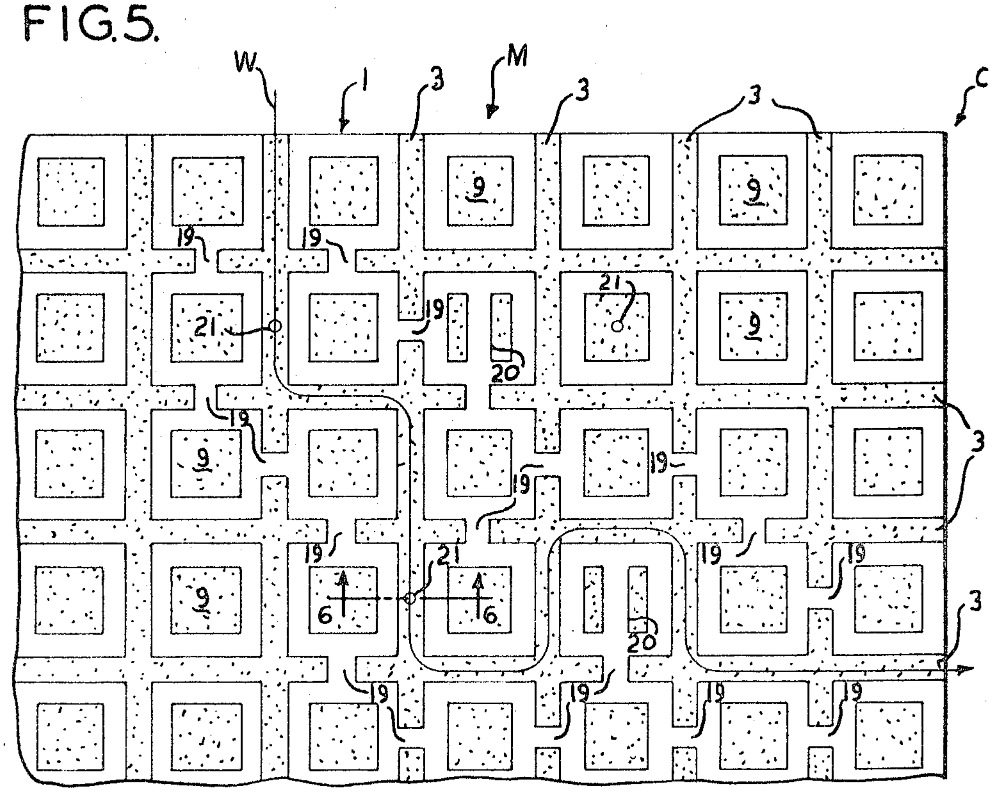
FIGURE 5 is a view similar to FIGURE 1, showing an example of how a master board may be converted into an operating circuit board.
Figure 6:
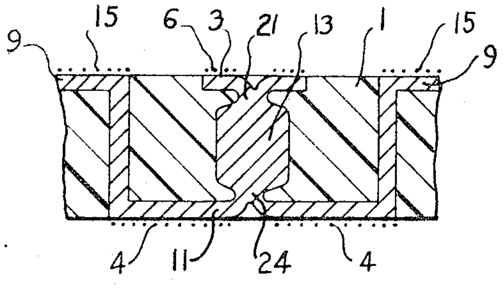
FIGURE 6 is an enlarged cross section taken on line 6—6 of FIGURE 5 showing a typical interconnection which may be effected in the form of the circuit board shown in FIGURES 1–6.
Figure 8:
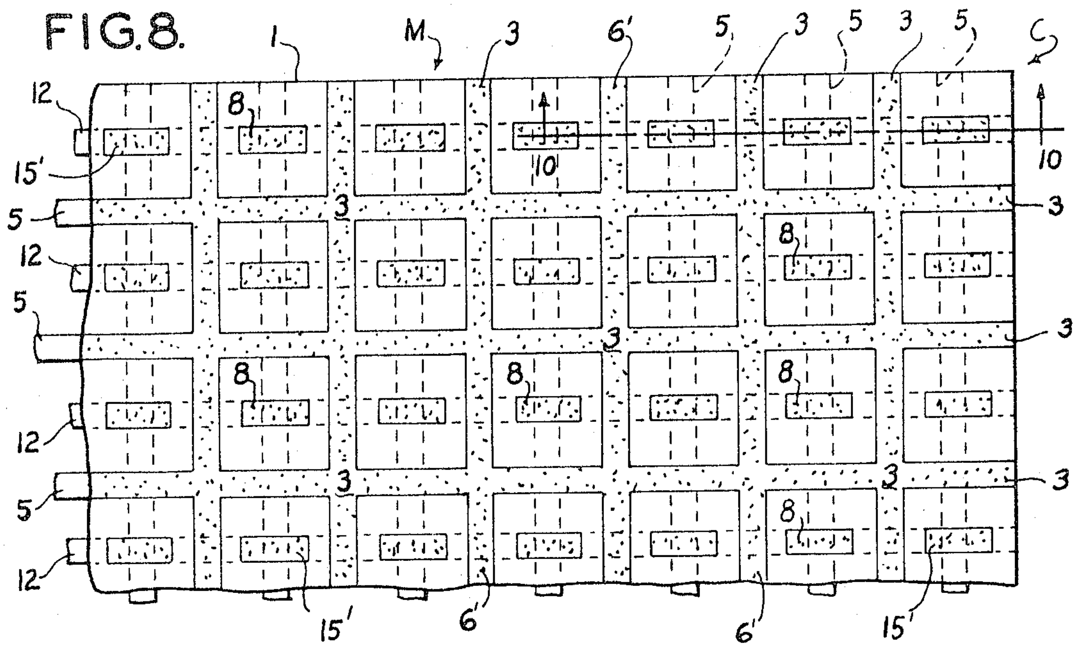
FIGURES 8–11 are views like FIGURES 1–4 respectively, illustrating a second form of the circuit board.

Heating means that the beam is sufficiently excited to pierce and heat foil overlying slug material so that they melt to form an electrical connection between them. Thus, as shown in FIGURE 6, a part of grid 3 and of slug 13 have been melted to form a connection 21 at the top. A like connection appears at 24 at the bottom. Thus a cross-connection is obtained (for example) between the segmented grid 3 and an exposed portion 11 of ribbon 7. Segmented grid 5 may likewise be connected to a ribbon 7. On FIGURE 5 the small circles 21 indicate where such interconnections have been made.

Scanning may be accomplished in two passes over the field on each side of each board M. For example, the tape T may be programmed so that on the first complete pass over the field on one side of the master board the beam B is excited for exposure of the photoresist layer 15 on the grid and ribbon material except at separation areas such as 19 and 20 (FIGURE 5) at which the beam on each sweep is temporarily deexcited for nonexposure. This is for the removal of resist material to form the separations. The etching removes materials only from a grid 3 or 5 or a ribbon 7 at points 19 and 20. The remainder of these grids and ribbons are protected against etching by the protective layer of exposed, developed and hardened film. A number of separations 19 in grids 3 and 20 in two ribbons 7 are illustrated in FIGURE 5. The separations 19 effect a current path such as shown by the serpentine dart W. This is only one of a number of paths that may be effected by establishing other separations or segmentations.

Next the same side of the board is again scanned by the beam B from an additional record on the same tape T or on another tape. Alternatively, it might be placed in another available scanning unit like the one shown in FIGURE 7. In this case the beam B is maintained at a comparatively low excitation until points are reached such as shown, for example, at 21 on FIGURES 5 and 6. At these locations the beam is excited to a heating condition for piercing grid 3 (for example), thus welding it to the underlying slug 13.

Next the board is turned over and the process above-described is repeated according to whatever program is desired, to outlet the grid circuitry and to provide welded connections between parts 11 of ribbon 7 and appropriate slugs 13, as shown for example at 24 on FIGURE 6. It will be understood that many more paths and cross-connections may be made on either side of the board than such as illustrated on one side of the board on FIGURE 5. To complete a board for making connections the hardened photoresist material indicated by the dotted lines is washed off by means of a suitable solvent to provide clean surfaces for welding on of solid-state networks or the like.

Another form of the invention is shown in FIGURES 8–12, which employ several variations. First, narrower intertwining ribbons are employed of widths substantially equal to the widths of the cross-bars of the grids. Second, a laser beam is used having a focusing trace R of diameter equal to or slightly larger than such widths. Third, a coarse pitch distance S rather than a grazing pitch distance is employed between scanning sweeps (FIGURE 11) about equal to the pitch distance between the ribbons and horizontal grid bars. Fourth, a positive photoresist material is used. In FIGURES 8–12, numerals like those used in describing FIGURES 1–7 indicate like parts and require no further description. Different parts having new numbers will be referred to specifically below.

Figure 9:
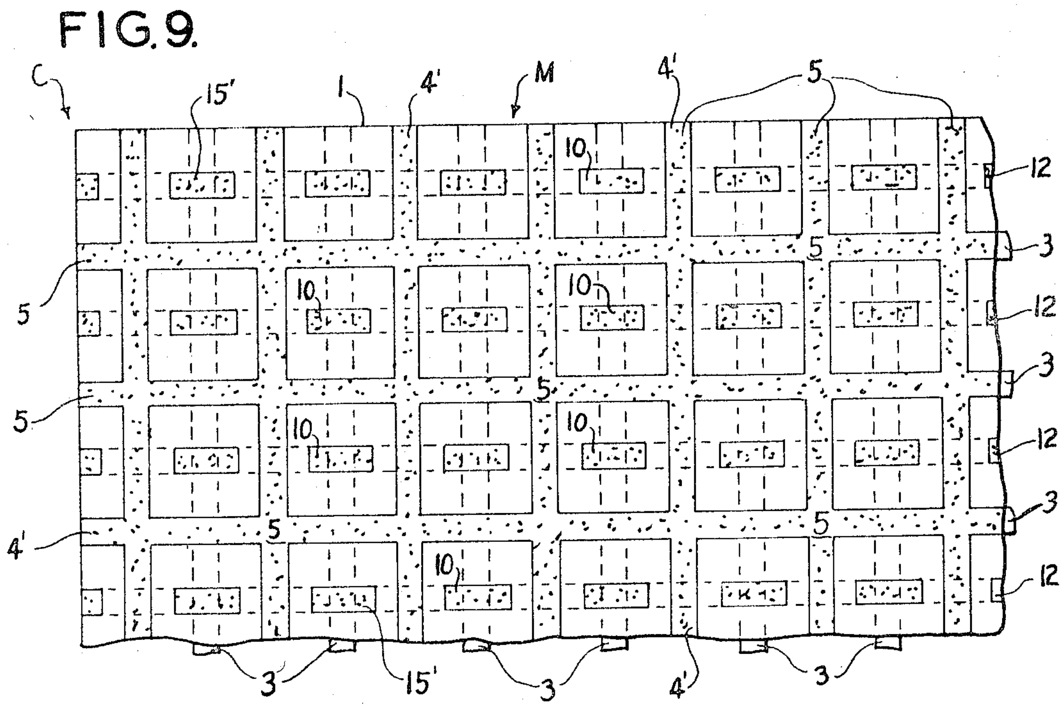
Figure 10:
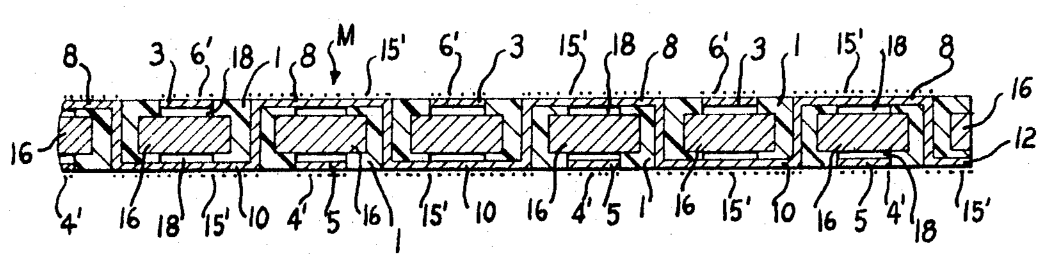

In FIGURES 8–12, numerals 12 indicate narrower intertwining ribbons substituted for the wider ribbons 7 of FIGURES 1–7. Again these may be referred to as linear conductors. As shown, these are of widths about equal to the widths of the cross-bars of the grids 3 and 5. Their exposed portions on opposite sides of the insulation are indicated by the numeral 8 on one side of the board (FIGURE 8) and by the numeral 10 on the other side of the board (FIGURE 9). The dots represents a conventional photopositive etch resist material. Such a resist material is one in which the area exposed to suitable incident radiations becomes removed by development, the remainder not so exposed forming a photective coat against etching. Such material is indicated at areas 4′, 6′ and 15′ in FIGURES 8–12 corresponding to the negative resist material areas 4, 6 and 15 in FIGURES 1–7. Weldable slugs 16 wider than the ribbons and grid bars (FIGURE 10) are substituted for the weldable slugs 13 of FIGURES 1–7. In FIGURES 8–12, above and below slugs 16 are spaces 18.

Figure 11:
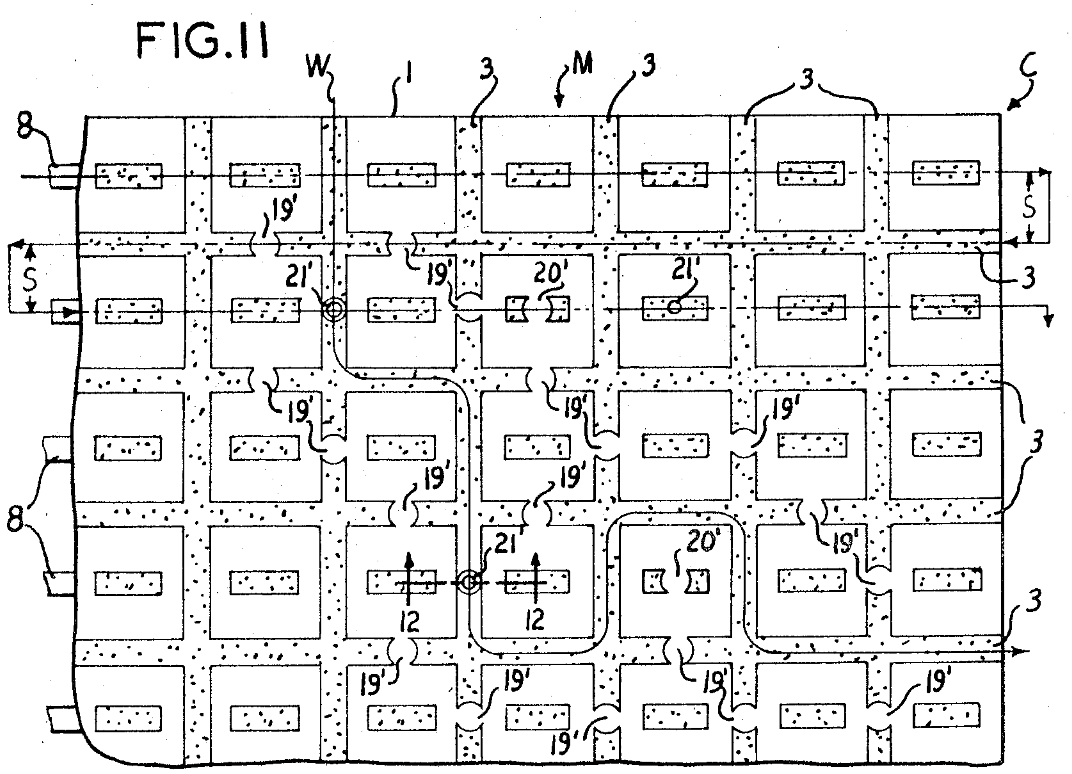
Figure 12:
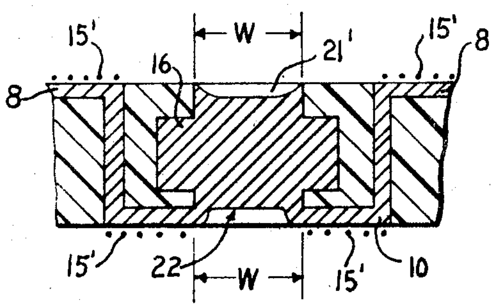
FIGURE 12 is an enlarged cross section taken on line 12—12 of FIGURE 11 showing an interconnection effected in said second form of the circuit board.

Operation of the FIGURES 8–12 form of the invention is as follows:

First the field of one side of a board is coarsely scanned at pitch distance S (FIG. 11) between scans which follow the horizontal courses of the ribbons 12 and horizontal grid bars. Since the size of the trace R is about equal to or somewhat greater than the widths of these ribbons and bars, it will effect cutting by single excitations of the beam to the "exposure" value wherever cutting is desired, and then developing and etching. This produces separations such as 19′ in the grid bars and 20′ in the ribbons 8 (FIGURE 11). Then the same field is again scanned with the beam programmed to be excited to the "heating" value at locations such as 21′ on the vertical grid bars. This causes connections between certain bars of the grid 3 and underlying slugs 16, as shown (FIGURES 11 and 12). Then the board is turned over and the operations repeated in response to an appropriate beam program to cut the bars of the grid 5 and ribbons 8; also to connect slugs 16 with grid 5, as desired and illustrated, at 22 (FIGURE 12). After all cuts and cross-connecting weldments have been completed, the positive photoresist material 4′, 6′ and 15′ is removed by means of a suitable solvent.

An advantage of the process illustrated by FIGURES 8–12 is that fewer scans are required to cover the field on each side of a board, with the consequence that fewer programmed signals are required to be supplied by the programming tape T. Thus in the form of FIGURES 8–12 one "exposure" signal per conductor cut in sufficient. In the FIGURES 1–7 form several sweeps and signals are required per cut.

While a board is shown having two grids, one on each side, boards may obviously be constructed with ribbons and only one grid on one side and some of the advantages of the invention obtained. Also either positive or negative photoresist material could be used with either embodiment disclosed although one particular type may be more advantageous than the other.

In view of the above, it will be seen that the several objects of the invention are achieved and other advantageous results attained.

As various changes could be made in the above products and methods without departing from the scope of the invention, it is intended that all matter contained in he above description or shown in the accompanying drawings shall be interpreted as illustrative and not in a limiting sense.

What is claimed is:

1. A circuit board comprising a layer of insulating material, exposed conductive grids having openings formed by cross-connected lengths of grid conductors and located on opposite sides of the layer, said grids being staggered in one direction across the board, zigzag conductors in the layer and extending between the grids in the general direction of the stagger of the grids, said zigzag conductors intertwining parts of the grid conductors and having spaced exposed portions on opposite sides of the layer and framed by the grid openings, and slugs of metallurgically bondable conductive material being located between said grids and said zigzag conductors.

2. A circuit board according to claim 1, including etch resist material covering the exposed grids and the exposed portions of said zigzag conductors.

3. A circuit board according to claim 2 wherein the etch resist material is of the photo-negative type.

4. A circuit board according to claim 2 wherein the etch resist material is of the photo-positive type.

5. A circuit board according to claim 1 wherein certain parts of the grids and of the zigzag conductors are segmented and each of certain of said slugs is metallurgically bonded at one of its ends to a part of a grid conductor and at the other end to a part of one of said zigzag conductors.

6. A circuit board comprising an insulating layer, a number of spaced zigzag conductors therein extending in one general direction across said layer and each conductor having spaced exposed portions thereof in opposite rows on opposite sides of the layer, parts of the insulating layer being located behind said exposed conductor portions, a mass of conductive material located in each of said part of the insulating layer, a grid attached on at least one side of said layer and formed of groups of transversely disposed cross-connected lines of conductive material, said grid being positioned relative to said zigzag conductors to locate one group of lines of conductive material of the grid between exposed portions of the zigzag conductors on said one side of said layer and to locate the other transverse group of its lines of conductive material crosswise of said zigzag conductors and between exposed portions thereof on the same side of the layer.

7. A circuit board comprising an insulating layer, spaced zigzag conductor ribbons therein extending in one general direction through and across the board, each of said conductor ribbons exposing rows of spaced conductive areas thereof in staggered positions on opposite sides of said layer, a portion of said insulating layer lying behind each of said exposed conductive areas, a slug of conductive material located in each of said portions, each slug adjacent one of its ends being crossed by one of said exposed conductive areas, an exposed conductive grid attached on each side of said insulating layer and having ribbon-like crossbars, each grid including a first set of crossbars extending substantially parallel to and between the lines of said spaced areas which are located on its side of the board, each grid also including on its side of the board a second set of crossbars extending between such lines of the exposed areas of the zigzag conductor ribbons as are on the same side of the board, crossbars of said second set on opposite sides of the board being staggered in the direction of stagger of said areas, whereby portions of said second set of crossbars become located over the slugs adjacent to their other ends, each of said slugs being metallurgically bondable by heat to the conductor ribbons located adjacent its opposite ends.

8. A circuit board comprising a layer of insulating material, exposed conductive grids having openings formed by cross-connected lengths of grid conductors and located on opposite sides of the layer, said grids being staggered in one direction across the board, zigzag conductors in the layer and extending between the grids in the general direction of the stagger of the grids, said zigzag conductors intertwining parts of the grid conductors and having spaced exposed portions on opposite sides of the layer and framed by the grid openings, etch resist material covering the exposed grids and the exposed portions of said zigzag conductors, slugs of metallurgically bondable conductive material located between said grids and said zigzag conductors, said insulating layer having openings at the ends of its contained slugs, said cross-connected lengths of grid conductors being of ribbon-like form and the intertwining conductors also being of ribbon-like form.

9. A master circuit board comprising an insulating layer, spaced ribbons therein of conductive material of zigzag form extending in one general direction across the board and exposing spaced but aligned areas thereof in staggered positions on two sides of said layer, said layer having pockets behind said exposed areas, slugs of meltable conductive material located in said pockets and surrounded therein by insulating material of said layer, a grid attached to at least one side of said layer and formed of transversely disposed lines of conductive material, said grid being positioned relative to said ribbons to locate lines of conductive material between said exposed areas of the ribbons and crossing at least some of said slugs.

10. A master circuit board according to claim 9, wherein the exposed surfaces of the ribbons and of the grid carry a coating of photosensitive material.

11. A master circuit board comprising an insulating layer, spaced ribbons therein of conductive material of zigzag form extending in one general direction across the board and each exposing spaced and aligned areas thereof on each side of the board, said exposed areas of each ribbon being in staggered positions on opposite sides of said insulating layer, said layer having pockets located between said exposed areas, slugs of meltable conductive material located in said pockets and surrounded therein by insulating material of said insulating layer, exposed grids formed of transversely disposed lines of conductive material and attached on opposite sides of said insulating layer, said grids being staggered in the direction of the extents of said ribbons, thereby to locate on the sides of the board staggered lines of conductive grid material extending between exposed areas of the ribbons and to locate transverse lines of conductive grid material between ribbons, said last-named lines being in registered positions on opposite sides of the board.

12. A master circuit board according to claim 11, including a coating of photosensitive material on substantially all exposed surfaces of the ribbons and grids.

13. A circuit board comprising an insulating layer, spaced ribbons therein of conductive material of zigzag form extending in one general direction across the board and each exposing spaced but aligned areas thereof on each side of the board, said exposed areas of each ribbon being in staggered positions on opposite sides of said insulating layer, said layer having pockets located between said exposed areas, exposed grids formed of transversely disposed lines of conductive material and attached on opposite sides of said insulating layer, said grids being staggered in the direction of the extents of said ribbons thereby to locate on the sides of the board staggered lines of conductive grid material extending between exposed areas of the ribbons and to locate transverse lines of conductive grid material between ribbons, said last-named lines being in registered positions on opposite sides of the board, slugs of conductive material located in some of said pockets and connecting some portions of said staggered lines of conductive grid material with some of said spaced exposed areas of the ribbons to form interconnections therebetween, some portions of at least one of said grids being separated from other portions thereof to determine at least one path of current flow therethrough.

14. A circuit board according to claim 13, wherein substantially all exposed surfaces of the ribbons and grids carry a photosensitive and developed coating.

References Cited

UNITED STATES PATENTS

| | | | |
|---|---|---|---|
| 2,883,447 | 4/1959 | Dahl | 174—68.5 |
| 3,356,786 | 12/1967 | Helms | 174—68.5 |
| 3,364,300 | 3/1965 | Bradham | 174—68.5 |

DARRELL L. CLAY, Primary Examiner

U.S. Cl. X.R.

29—625; 219—121; 355—78